US 12,346,356 B2

United States Patent
Chen et al.

(10) Patent No.: US 12,346,356 B2
(45) Date of Patent: Jul. 1, 2025

(54) GRAPH AND VECTOR USAGE FOR AUTOMATED QA SYSTEM

(71) Applicant: International Business Machines Corporation, Armonk, NY (US)

(72) Inventors: Ming Jin Chen, Ningbo (CN); Yuan Li, Ningbo (CN); Tong Liu, Xi'an (CN); Yuan Yuan Li, Beijing (CN); Yuan Zhang, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/500,761

(22) Filed: Nov. 2, 2023

(65) Prior Publication Data
US 2025/0147993 A1    May 8, 2025

(51) Int. Cl.
*G06F 16/00*    (2019.01)
*G06F 16/334*    (2025.01)
*G06F 16/901*    (2019.01)

(52) U.S. Cl.
CPC ...... *G06F 16/3344* (2019.01); *G06F 16/9024* (2019.01)

(58) Field of Classification Search
CPC .......................... G06F 16/3344; G06F 16/9024
See application file for complete search history.

(56) References Cited

U.S. PATENT DOCUMENTS

| 11,625,620 | B2 | 4/2023 | Singaraju et al. | |
| 2019/0065627 | A1* | 2/2019 | De Mel | G06F 40/247 |
| 2019/0251169 | A1* | 8/2019 | Loghmani | G06F 40/295 |
| 2020/0242444 | A1* | 7/2020 | Zhang | G06N 3/042 |
| 2021/0049194 | A1* | 2/2021 | Arcienega | G06F 16/3329 |
| 2021/0192372 | A1* | 6/2021 | Kang | G06F 16/2282 |
| 2022/0292262 | A1* | 9/2022 | Japa | G06F 16/90332 |
| 2023/0017672 | A1* | 1/2023 | Josephson | G06F 40/295 |
| 2023/0169361 | A1* | 6/2023 | Mitra | G06N 3/006 |
| | | | | 706/12 |

(Continued)

FOREIGN PATENT DOCUMENTS

| CN | 113569054 A | 10/2021 |
| CN | 115982338 B | 6/2023 |

(Continued)

OTHER PUBLICATIONS

Sang-Hyuk Lee et al., "A Question-Answering Model Based on Knowledge Graphs for the General Provisions of Equipment Purchase Orders for Steel Plants Maintenance," Electronics 2023, Date: Jun. 1, 2023, pp. 1-36.

(Continued)

*Primary Examiner* — Alexander Khong
(74) *Attorney, Agent, or Firm* — Patterson + Sheridan, LLP

(57) ABSTRACT

A method for conversational query resolution includes receiving a query input from a user. The query input is decomposed into a plurality of tasks. A knowledge graph is queried to identify one or more relevant entities based on at least one of the plurality of tasks. A vector database is searched to identify one or more text chunks that correspond to the one or more relevant entities. Content relevant to at least one of the plurality of tasks is identified from the one or more text chunks. An answer is generated based on the identified content.

17 Claims, 7 Drawing Sheets

(56) References Cited

U.S. PATENT DOCUMENTS

2023/0267338 A1* 8/2023 Kotnis ............... G06F 16/3338
                                                                706/45
2023/0342629 A1* 10/2023 Panda ..................... G06N 5/02
2024/0241897 A1* 7/2024 Wang ................... G06F 16/338

FOREIGN PATENT DOCUMENTS

| CN | 116226398 A | 6/2023 |
| CN | 116383349 A | 7/2023 |
| WO | 2021217935 A1 | 11/2021 |

OTHER PUBLICATIONS

Shulin Hu et al., "Domain Knowledge Graph Question Answering Based on Semantic Analysis and Data Augmentation," Applied Sciences, 2023, Dated: Jul. 31, 2023, pp. 1-23.
Fedor Moiseev et al., "SKILL: Structured Knowledge Infusion for Large Language Models," Proceedings of the 2022 Conference of the North American Chapter of the Association for Computational Linguistics: Human Language Technologies, Date: Jul. 10-15, 2022, pp. 1581-1588.

* cited by examiner

GRAPH AND VECTOR USAGE FOR AUTOMATED QA SYSTEM

BACKGROUND

The present disclosure relates to artificial intelligence question-answering systems, and more specifically, using such artificial intelligence question-answering systems to generate natural language responses to queries.

SUMMARY

One embodiment of the present disclosure provides a computer-implemented method that includes receiving a query input from a user. The query input is decomposed into a plurality of tasks. A knowledge graph is queried to identify one or more relevant entities based on at least one of the plurality of tasks. A vector database is searched to identify one or more text chunks that correspond to the one or more relevant entities. Content relevant to at least one of the plurality of tasks from the one or more text chunks is identified. An answer based on the identified content is generated.

Other embodiments in this disclosure provide non-transitory computer-readable mediums containing computer program code that, when executed by operation of one or more computer processors, performs operations in accordance with one or more of the above methods described above, as well as systems comprising one or more computer processors and one or more memories containing one or more programs that, when executed by the one or more computer processors, perform an operation in accordance with one or more of the above methods described above.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 1:
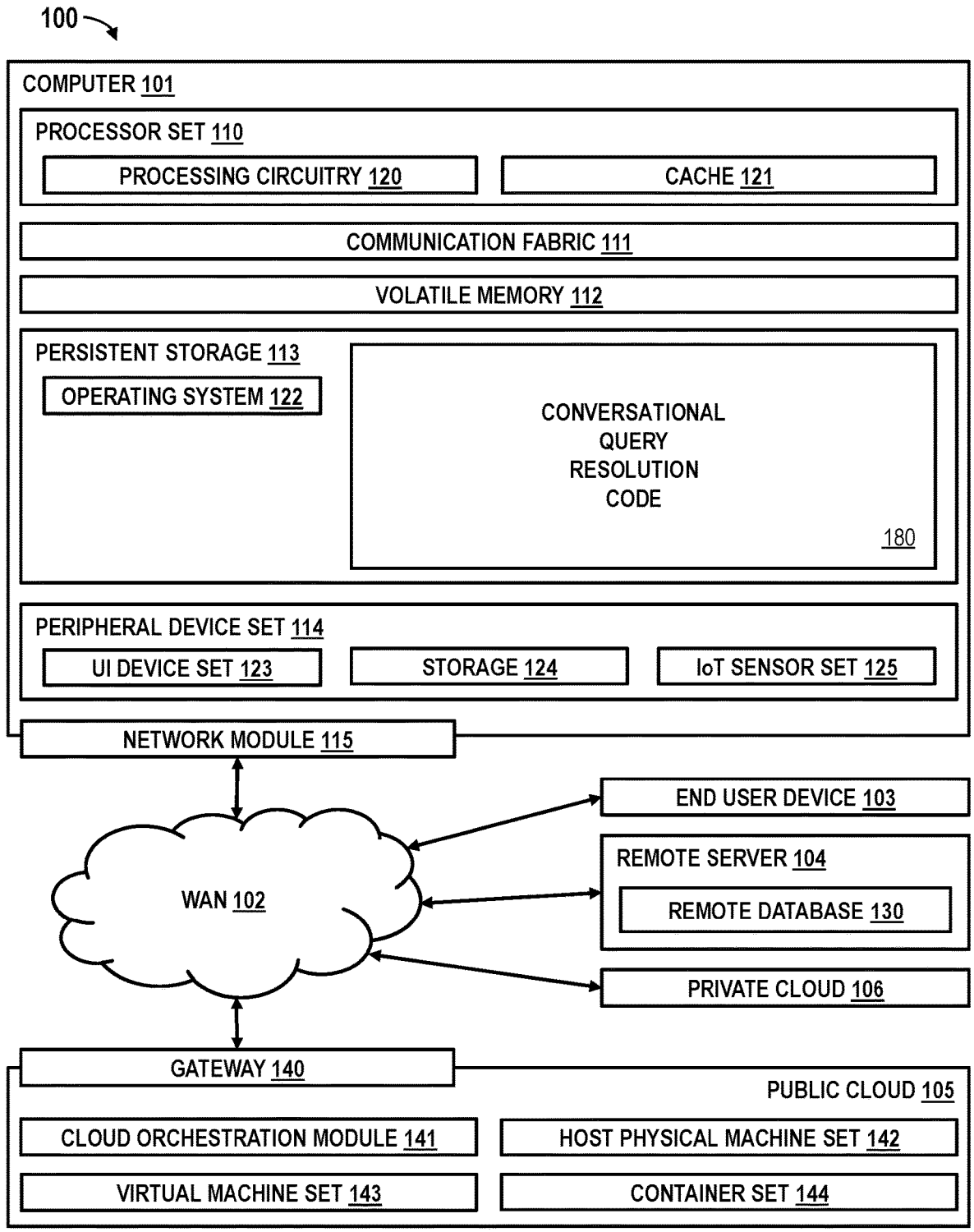
FIG. 1 depicts an example computing environment for the execution of at least some of the computer code involved in performing the inventive methods.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One embodiment of the present disclosure provides a computer-implemented method that includes receiving a query input from a user. The query input is decomposed into a plurality of tasks. A knowledge graph is queried to identify one or more relevant entities based on at least one of the plurality of tasks. A vector database is searched to identify one or more text chunks that correspond to the one or more relevant entities. Content relevant to at least one of the plurality of tasks from the one or more text chunks is identified. An answer based on the identified content is generated. The disclosed embodiment combines the knowledge graph queries with vector searches, and therefore improves the efficiency and accuracy of both query processing and response generation.

In some embodiments, the knowledge graph includes a plurality of entities, and each entity of the plurality of entities in the knowledge graph is associated with a respective text chunk within the vector database using a chunk identifier. One advantage of such embodiments is that by directly associating the knowledge graph with the vector database, and rapid retrieval of relevant data from vast volumes of unstructured text is facilitated for the received query.

In some embodiments, each of the respective text chunks includes text extracted from a corpus of unstructured documents. In this way, the knowledge of an automated artificial intelligence question answer system is enhanced to be able to provide answers from a greater variety of subjects regarding which unstructured documents are received and analyzed.

In some embodiments, each respective text chunk is vectorized into a respective vector representation using an embedding model. In this way, the information to enhance an automated artificial intelligence question answer system is represented in a uniform system to facilitate rapid and accurate analysis and retrieval of information for answer determination and presentation.

In some embodiments, the content relevant to the plurality of tasks from the one or more text chunks is identified using a vector-based similarity technique. One advantage provided by such embodiments is the enhanced accuracy in identifying contextually relevant content from the refined text chunks for the received query.

In some embodiments, a vector-based similarity technique used to identify the content includes comparing at least one of cosine similarity or distance similarity between vector representations of the one or more text chunks and each of the plurality of tasks. In this way, data analysis and machine learning features are harnessed to improve search and analysis functions for an AI QA system.

In some embodiments, the computer-implemented method includes receiving feedback from the user regarding an accuracy of the answer. The knowledge graph may be updated based on the feedback. Such embodiments allow for dynamic updating of the knowledge graph, and therefore improve the efficiency for future query processing by potentially generating answers directly from the updated graph without extensive searches.

In some embodiments, the process of updating the knowledge graph and the vector database based on the feedback includes adding one or more new entities to the knowledge graph, where each of the one or more new entities comprises data derived from the answer. In this manner, human knowledge is used to enhance the performance of the artificial intelligence question-answering system.

In some embodiments, the process of generating the answer based on the identified content includes aggregating the identified content based on logical relationships between each of the plurality of tasks. The answer in natural language is generated based on the aggregated content using natural language processing algorithms. Such embodiments enable the generation of a natural language answer that includes information contextually related to the received query.

Other embodiments in this disclosure provide computer-readable mediums containing computer program code that, when executed by operation of one or more computer processors, performs operations in accordance with the various methods described above Other embodiments in this disclosure provide systems that include one or more computer processors and one or more memories containing one or more programs that, when executed by the one or more computer processors, perform an operation in accordance with the various methods described above.

Large Language Model (LLM)-based question-answering systems utilize natural language processing algorithms to extract information from extensive textual data in response to user queries. Based on the extracted information, these systems then generate conversational and contextually relevant natural language responses. The interaction between the natural language query and the generated contextually relevant responses forms the core of a conversational and user-friendly interface. Embodiments of the present disclosure provide techniques and methods that integrate knowledge graphs and vector searches into the LLM-based question-answering systems. Through this integration, the knowledge graph can be used to confine the vector search scope during extensive document searches, which therefore improves the accuracy of vector search results. By refining the vector search scope, these disclosed techniques and methods can effectively reduce the context size provided to the LLM, and therefore optimize the model's efficiency in processing and generating natural language answers.

One embodiment of the present disclosure describes techniques and methods for generating knowledge graphs from unstructured text and associating the graph with vectorized text chunks within a database. For example, when a large volume of unstructured text data is provided, a system may analyze the data to extract entities and categorize these entities based on their relationships. The system may subsequently generate a comprehensive knowledge graph that captures these extracted entities and relationships. In some embodiments, the knowledge graph may serve as a structured representation of the entities and relationships found within the unstructured text data. The system may further segment the unstructured text data into distinct text chunks, vectorize each text chunk using advanced embedding models, and store the chunks into a vector database. In some embodiments, each text chunk may correspond to an entity in the knowledge graph. After the knowledge graph and the text chunks are prepared, the system may establish an association mechanism (e.g., using a chunk identifier) that links each graph entity with its corresponding text chunk in the database. In some embodiments, this association mechanism may facilitate quick retrieval of relevant text data based on knowledge graph searches.

Another embodiment of the present disclosure provides techniques and methods for producing natural language responses based on the created knowledge graphs, the vector database, and the LLM. For example, upon receiving a user's query, a system may utilize the LLM to understand the underlying tasks or questions within the query, and decompose the query into several sub-tasks. By searching the knowledge graph using these sub-tasks, relevant entities to the query may be identified. The search process within the knowledge graph may effectively refine the vector search, and therefore improve the accuracy of vector search results. After the relevant entities are identified, the system may retrieve the associated vectorized text chunks from the vector database. The system may use the LLM to process the retrieved text data and generate a natural language response to the user's query.

FIG. 1 depicts an example computing environment for the execution of at least some of the computer code involved in performing the inventive methods.

Computing environment 100 contains an example of an environment for the execution of at least some of the computer code involved in performing the inventive methods, such as Conversational Query Resolution Code 180. In addition to Conversational Query Resolution Code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Conversational Query Resolution Code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Conversational Query Resolution Code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface-type operating systems that employ a kernel. The code included in Conversational Query Resolution Code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
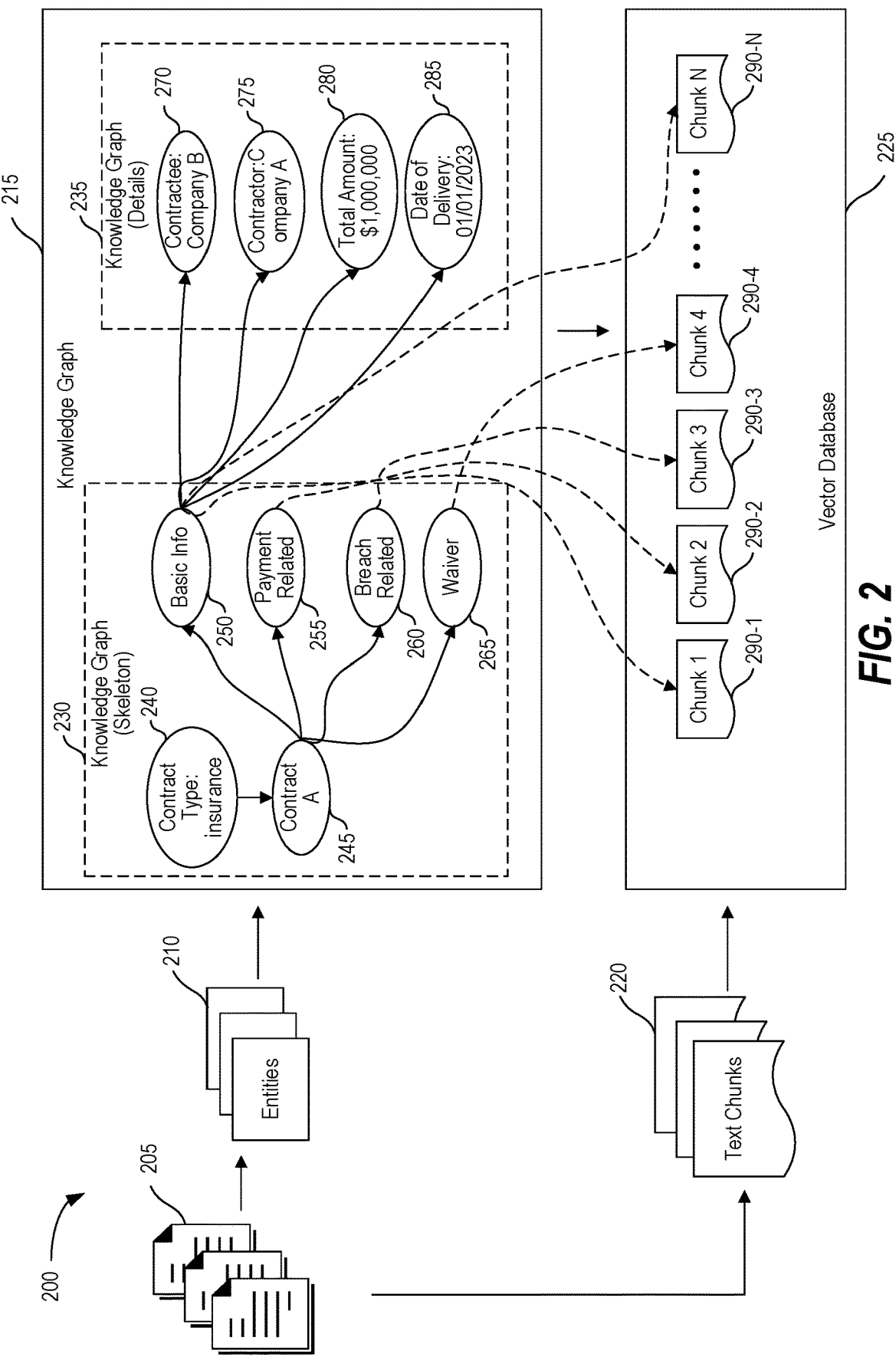
FIG. 2 depicts an example of a workflow for generating a knowledge graph and integrating the graph with a vector database, according to some embodiments of the present disclosure.
Figure 7:
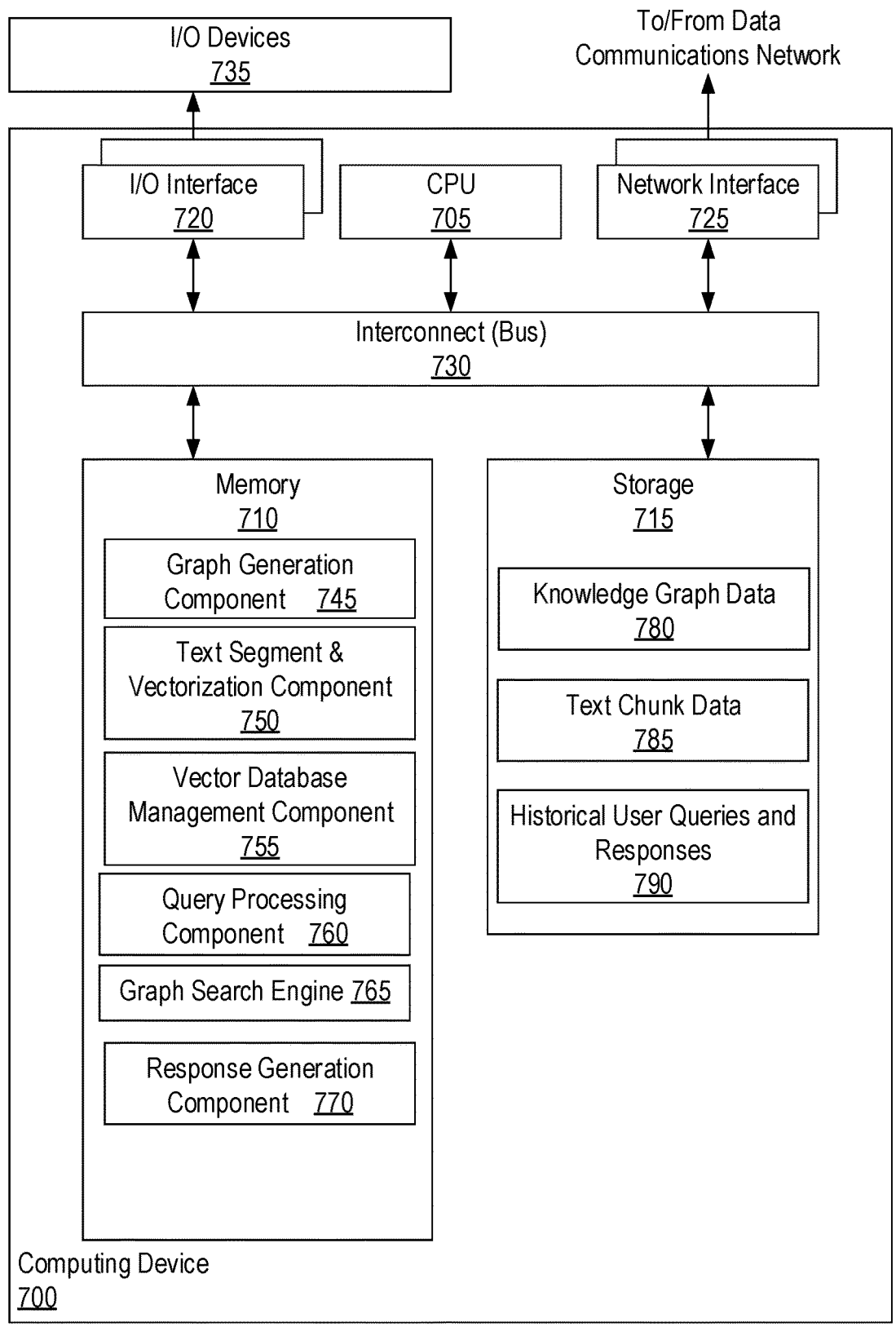
FIG. 7 depicts an example computing device for knowledge extraction and natural language response generation, according to some embodiments of the present disclosure.

FIG. 2 depicts an example of a workflow 200 for generating a knowledge graph and integrating the graph with a vector database, according to some embodiments of the present disclosure. In some embodiments, the workflow 200 may be performed by one or more computing systems, such as the computer 101 as illustrated in FIG. 1, and particularly by the conversational query resolution code 180 that is stored on the computer 101, and/or the computing device 700 as illustrated in FIG. 7.

In the illustrated example, unstructured documents 205 (also referred to in some embodiments as unstructured text data) (e.g., contract documents) are processed to extract entities 210. The unstructured documents 205 may include specific pieces or chunks of text that can be identified and categorized by their inherent role or meaning within the documents. In one embodiment, entities 210 may serve as a quick reference to those specific pieces or chunks of text. In some embodiments, entities 210 may be divided into skeleton entities and detail entities. Skeleton entities may include the titles or section headers that delineate different parts of the document, such as "Basic Information" 250, "Payment Related" 255, "Breach Related" 260, or "Waiver" 265. Detail entities, in contrast, may refer to specific named items or details within these sections, such as "Contractee" 270, "Contractor" 275, "Total Amount" 280, or "Date of Delivery" 285. In some embodiments, pre-trained named entity recognition (NER) models may be used to identify and categorize these entities within the unstructured documents. Such NER models are in some embodiments stored in the computer 101 and/or in a remote server 104 that is accessed via the computer 101 transmitting one or more instruction signals via the wide area network 102. In some embodiments, before entity extraction, the unstructured documents 205 may be preprocessed to make them more adaptable to analysis. For example, unstructured documents 205 may be in various formats, such as Word Documents, PDFs, scanned images, and/or handwritten notes. In such configurations, these unstructured documents 205 may need to be preprocessed to extract plain text. Additionally, text within these unstructured documents 205 may include unnecessary information (e.g., headers, footers, or decorative elements), which may be removed before performing entity extraction. In some embodiments, after entities 210 have been recognized, the entities 210 may be standardized for consistency, such as unifying variations like "Inc." v. "Incorporated." In some embodiments, relationships between the entities 210 may also be identified and recognized during the entity extraction process. For example, detail entities such as "Contractee" 270, "Contractor" 275, "Total Amount" 280, or "Date of Delivery" 285, may provide details about the skeleton entity "Basic Info" 250, as is indicated by the solid lines with arrowheads running from the basic info 250 to these detail entities 270, 275, 280, and 285, respectively. The recognized relationships may then be incorporated into a knowledge graph 215, e.g., by providing arrows between nodes. By accurately mapping these relationships, the knowledge graph may provide more efficient and precise searches within its structure.

In the illustrated examples, the extracted entities (along with their relationships) are used to generate a knowledge graph 215. The knowledge graph 215 is stored in memory of the computer 101 and/or in memory that is accessible to the computer 101, e.g., in memory of a remote server 104. As illustrated, the knowledge graph 215 includes two main parts, the skeleton graph 230 and the detail graph 235. The skeleton graph includes skeleton entities extracted from the unstructured documents. Each of these entities is visualized as a distinct node within the graph, such as "Contract Type: Insurance" 240, "Contract A" 245, "Basic Info" 250, "Payment Related" 255, "Breach Related" 260, or "Waiver" 265. These nodes are connected by arrows, which depict their inter-relationships. For example, as illustrated, the arrow extended from the node "Contract Type: Insurance" 240 to the node "Contract A" 245 indicates that "Contract A" falls under the category of insurance contracts. Additionally, the node "Contract A" 245 also has arrows pointing towards nodes such as "Basic Info" 250, "Payment Related" 255, "Breach Related" 260, and "Waiver" 265. These arrows imply that the "Basic Info" 250, the "Payment Related" 255, the "Breach Related" 260, and the "Waiver" 265 contain information that is a subset of the "Contract A" 245. The hierarchical structure further extends to the detail graph 235, which includes detail entities extracted from the unstructured documents 205. Each of these detail entities is depicted as a distinct node within the graph 235, such as "Contractee" 270, "Contractor" 275, "Total Amount" 280, and "Date of Delivery" 285. Each of these detail entities is connected to a skeleton entity within the skeleton graph 230 by one or more arrows. For example, arrows extending from "Basic Info" 250 and pointing towards detail entities like "Contractee" 270, "Contractor" 275, "Total Amount" 280, and "Date of Delivery" 275 indicate that these detail entities are related to the "Basic Info" 250. Specifically, these detail entities contain information that is a subset of the broader "Basic Info" 250 category. In some embodiments, the hierarchical structure within the knowledge graph 215 may offer an organized data representation. The clear and logical layout within the knowledge graph may facilitate efficient data retrievals by effectively confining the scope for future vector searches.

In some embodiments, the entity node within the knowledge graph 215 may contain attributes that store some basic information. For example, the "Total Amount" node 280 may include an attribute (e.g., "amount") with a value of "$1,000,000," and the "Date of Delivery" node 285 may include an attribute (e.g., "delivery date") and specify its value as "Jan. 1, 2023." In some embodiments, the information embedded within each entity node may be used to answer certain queries directly. For example, a query about the total amount of Contract A may be immediately addressed with the "$1,000,000" value from the "Total Amount" node 280 without requiring any additional vector searches.

In the illustrated example, the raw text data from the unstructured documents 205 is divided into text chunks 220 according to these identified entities 210. In some embodiments, each of these text chunks 220 may include a collection of text that corresponds to a specific node entity within the constructed knowledge graph 215. To enable efficient storage and retrieval, these text chunks 220 are then transformed into vector representations. In some embodiments, the process of converting each text chunk into a vector may involve using text embedding models, such as TF-IDF, Word2Vec, or BERT, to capture the semantic meaning and relationships within the text. Such text embedding models are in some embodiments stored in the computer 101 and/or in a remote server 104 that is accessed via the computer 101 transmitting one or more instruction signals via the wide area network 102. After vectorization, these chunks (e.g., 290-1, 290-2, 290-3, 290-4, and 290-N) are stored within a vector database 225. The vector database 225 is stored in memory of the computer 101 and/or in memory that is accessible to the computer 101, e.g., in memory of a remote server 104. Each vectorized chunk is linked to its corresponding entity node within the knowledge graph. For example, as illustrated, entity node "Basic Info" 250 is linked to Chunk 1 (e.g., 290-1) and Chunk N (e.g., 290-N) (as depicted by dashed arrows), entity node "Payment Related" 255 is linked to Chunk 2 (e.g., 290-2) (as depicted by a dashed arrow), entity node "Breach Related" 260 is linked to Chunk 3 (e.g., 290-3) (as depicted by a dashed arrow), and entity node "Waiver" 265 is linked to Chunk 4 (e.g., 290-4) (as depicted by a dashed arrow). In some embodiments, the association between the knowledge graph 215 and the vector database 225 may be achieved by assigning a unique chunk identifier (ID) to each vectorized text chunk (e.g., 290-1, 290-2, 290-3, 290-4, and 290-N). The unique chunk ID for a text chunk may then be integrated into the chunk's corresponding entity node (e.g., 265) within the knowledge graph 215. In such a configuration, when a query is processed and used to search through the knowledge graph, a system, e.g., the computer 101 with the conversational query resolution code 180, may identify relevant entities and their associated chunk IDs. Using these chunk IDs as references, the system may then conduct a search through the vector database to retrieve the relevant vectorized text chunks (e.g., 290-1, 290-2, or 290-N).

Figure 3:
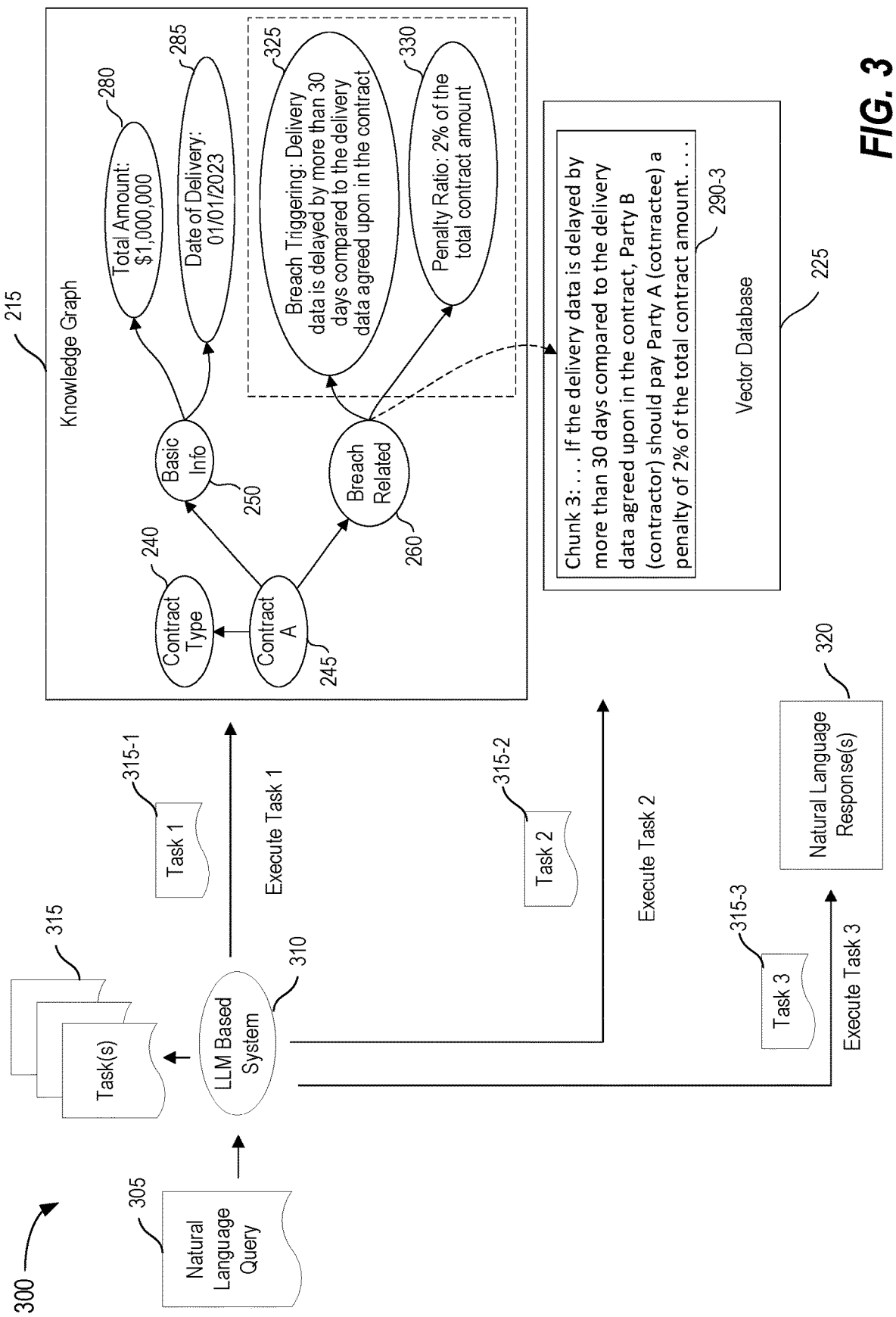
FIG. 3 depicts an example of a workflow for interpreting queries and generating natural language responses using knowledge graphs, its integrated vector databases, and LLM models, according to some embodiments of the present disclosure.

FIG. 3 depicts an example of a workflow 300 for interpreting queries and generating natural language responses using knowledge graphs, integrated vector databases, and LLM models, according to some embodiments of the present disclosure. In some embodiments, the workflow 300 may be performed by one or more computing systems, such as the computer 101 as illustrated in FIG. 1 that includes the conversational query resolution code 180, and/or the computing device 700 as illustrated in FIG. 7.

In the illustrated example, a natural language query 305 is provided to an LLM based system 310 that includes the conversational query resolution code 180. In some embodiments, the natural language query may refer to a user's question or request that asks for specific information from large volumes of data without using specialized query language or syntax. For example, a query to search specific information from large amounts of contract documents may be written as, "Search contracts that have Company A as contractor and with penalties for breach exceeding $50,000." Upon receiving the query, the LLM based system 310 may first process the query to understand its context and intent. Based on the understanding, the LLM based system 310 may break down the query into multiple tasks 315, to avoid unnecessary data processing and optimize the data retrieval process. Following the above mentioned example, the query to "search contracts that have Company A as a contractor and the penalty for breach exceeding $50,000" may be decomposed into three tasks: (1) querying the knowledge graph to find contracts where Company A serves as a contractor, and returning chunk IDs related to contract breaches, as well as basic information about the contract (e.g., total contract amount, and date of delivery) (as depicted by Task 1 (315-1)); (2) based on the chunk IDs, retrieving the vectorized text chunks related to contract breaches from a vector database, and analyzing the content within these text chunks using LLM to determine penalty clauses (e.g., breach triggering conditions, breach penalty percentage, and the logic behind the penalty calculation) (as depicted by Task 2 (315-2)); (3) based on the penalty clauses, calculating the potential breach penalty, filtering out contracts where the penalty for breach does not exceed $50,000, and producing a natural language response that includes a list or summary of contracts that satisfy the criteria (e.g., Company A serves as a contractor and the penalty for breach exceeds $50,000) (as depicted by Task 3 (315-3)).

In the illustrated example, the LLM based system executes Task 1 (e.g., 315-1) by searching through the knowledge graph 215. During the execution, the system identifies "Contract A" as one of the contracts that list Company A as a contractor, and returns the chunk ID (290-3) associated with the node "Breach Related" 260, as well as basic information related to Contract A that is retrieved from the "Total Amount" node 280 (e.g., $1,000,000) and the "Date of Delivery" node 285 (e.g., Jan. 1, 2023).

The system then proceeds to execute Task 2 (e.g., 315-2). Using the returned chunk ID as a key, the system searches through the vector database to retrieve the vectorized text chunks related to contract breaches. In the illustrated example, the "Breach Related" node 260 is linked to Chunk 3 (e.g., 290-3) in the vector database 225 (as depicted by a dashed arrow), which contains detailed information related to the violation clauses of Contract A, such as the breach triggering conditions, the penalty percentage, and the formula used to calculate penalties in the event of a contract breach. Based on the chunk ID, the chunk 3 (e.g., 290-3) is identified and retrieved. The system then proceeds to execute Task 3 (e.g., 315-3), where the system interprets and analyzes the content (e.g., using LLM) within the retrieved chunks (e.g., 290-3). The LLM in some embodiments applies ML techniques for relationship extraction and/or word disambiguation to perform the content interpretation and analysis, but is able to start from a basis of the vectors instead of from natural language text. The system evaluates the trigger conditions, the mathematical formulas, and the percentages associated with penalties in Contract A, and determines whether the penalties for breach in Contract A will exceed $50,000. In some embodiments, during the execution of Tasks 1-3, more than one contract may be identified and subsequently evaluated. After all evaluations have been completed, the system may generate a natural language response 320 using an LLM. In some embodiments, the response may include a list or a summary of contracts that list Company A as contractor and has a penalty for breach exceeding $50,000. In some embodiments, the execution of Tasks 1-3 may be performed entirely by an LLM agent (e.g., 310). In some embodiments, the execution of Tasks 1-3 may be distributed across any number of components or modules. Each of these components or modules may perform a specific function or operation, such as knowledge graph querying, vector database searches, or content analysis, and work collaboratively to achieve the overall objective.

After the response is generated and sent to the user, in some embodiments, the system may further update the knowledge graph 215 by adding one or more nodes. As illustrated, two sub-nodes 325 and 330 are added following the "Breach Related" node 260, where node 325 includes an attribute of "breach triggering," and a value of "delivery data is delayed by more than 30 days compared to the delivery data agreed upon in the contract," and node 330 includes an attribute of "penalty ratio" and stores a value of "2% of the total contract amount." The updated knowledge graph may facilitate more efficient response generation when receiving similar or related queries in the future. The system may directly extract answers from the nodes without the need for repeated vector database searches. By iteratively updating the knowledge graph based on generated answers, the system may improve both accuracy and efficiency in handling future queries of a similar nature.

Figure 4:
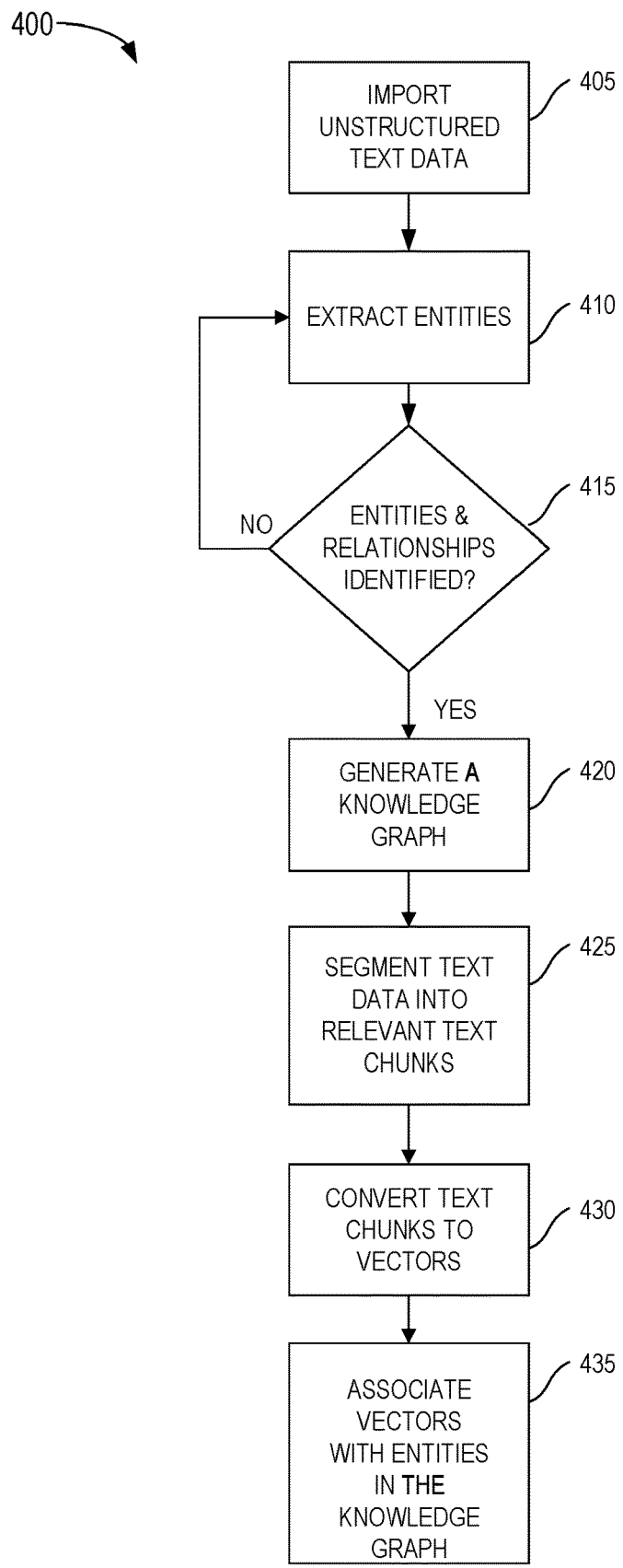
FIG. 4 depicts an example method for knowledge graph generation and vector database integration, according to some embodiments of the present disclosure.

FIG. 4 depicts an example method 400 for knowledge graph generation and vector database integration, according to some embodiments of the present disclosure. In some embodiments, the method 400 may be performed by one or more computing devices, such as the computer 101 as illustrated in FIG. 1, the LLM based system 310 as illustrated in FIG. 3, and/or the computing device 700 as illustrated in FIG. 7.

The method 400 begins at block 405, where a computing system receives or imports large volumes of unstructured text data (e.g., 205 of FIG. 2). In some embodiments, the unstructured text data may come from various sources, such as documents (e.g., contracts), websites, or user inputs.

At block 410, the computing system may process the unstructured text data and extract meaningful or key entities (e.g., "Basic Info" 250 of FIG. 2) present within the data. The extracted entities may vary based on the nature of the unstructured data source. In some embodiments, the entities may include titles, section headers, names of parties, dates, and/or other specific entities. In some embodiments, the entities may serve as quick references to locate specific chunks of information that were taken from the unstructured data. In some embodiments, depending on the complexity of the data, named entity recognition (NER) models may be used within the process of entity extraction. In some embodiments, besides extracting individual entities, relationships between these entities may also be identified. For example, when processing a contract document, the system may initially identify broader entity categories, such as "Basic Info" (e.g., 250 of FIG. 2), "Payment Related" (e.g., 255 of FIG. 2), "Breach Related" (e.g., 260 of FIG. 2), and "Waiver" (e.g., 265 of FIG. 2). Each of these broader entities may provide a more general context for the associated data. The system may further process the data related to "Basic Info" and extract more specific entities, such as "Contractee" (e.g., 270 of FIG. 2), "Contractor" (e.g., 275 of FIG. 2), "Total Amount" (e.g., 280 of FIG. 2), and "Date of Delivery" (e.g., 285 of FIG. 2). These more specific entities may be identified as sub-entities of the "Basic Info" (e.g., 250 of FIG. 2). The tiered relationships may be incorporated into a knowledge graph (e.g., 215 of FIG. 2). For example, in a knowledge graph, the "Basic Info" node (e.g., 250 of FIG. 2) may connect to several sub-nodes, such as "Total Amount" (e.g., 280 of FIG. 2) or "Date of Delivery" (e.g., 285 of FIG. 2). By following these connections, the system can quickly search through the knowledge graph, and effectively locate the relevant entities or nodes for a given query.

At block 415, the computing system evaluates the identified entities and their respective relationships from the unstructured data. The evaluation aims to determine whether the entity extraction at block 410 is accurate and complete. If the system determines that either the entity extraction is incomplete (e.g., some entities are overlooked), or relationships between identified entities are not clear (e.g., caused by overlapping context, or vague phrasing), the method 400 returns to block 410, where the computing system may adjust the internal parameters of the extraction algorithms to capture missed entities or clarify ambiguous relationships. If the computer system determines that the entity extraction is complete and accurate, which indicates that all relevant entities have been recognized and their relationships have been correctly mapped without any ambiguities or inconsistencies, the method 400 proceeds to block 420.

At block 420, the computing system generates a knowledge graph for the unstructured text data using the extracted entities and their identified relationships. In some embodiments, within the knowledge graph, each node may present an extracted entity, and the edges or links between these nodes depict the relationships between them. For example, the "Basic Info" node (e.g., 250 of FIG. 2) within the knowledge graph (e.g., 215 of FIG. 2) connects to each sub-node like "Date of Delivery" (e.g., 285 of FIG. 2) or "Total Amount" node (e.g., 280 of FIG. 2) by a respective link (as depicted by a solid arrow between "Basic Info" node 250 and "Date of Delivery" node 285). In such a configuration, the knowledge graph may provide a visual and structured representation of how different entities relate to and/or interact with each other within the unstructured data. In some embodiments, the knowledge graph may facilitate more efficient and precise searches for a received query.

In some embodiments, the entity node within the knowledge graph may contain attributes that store some specific pieces of information, which can be used for answering queries directly without performing any additional vector searches. For example, a "Total Amount" node (e.g., 280 of FIG. 2) may include an attribute "amount" with a value of "$1,000,000." When a query asks for the total amount of a contract, the computing system can quickly access the "Total Amount" node and respond with "$1,000,000" without searching the vector database.

At block 425, the computing system segments the unstructured text data into text chunks (e.g., 220 of FIG. 2) based on the extracted entities from block 410. For example, if the knowledge graph has an entity node such as "Basic Info", the associated text data may be segmented into chunks that provide details about this entity, such as names of parties, date of delivery, and total amount of the contract.

At block 430, the computing system converts the segmented text chunks into vector representations (e.g., 290-1 of FIG. 2). In some embodiments, the vectorization may be implemented using one or more embedding models, such as Word2Vec, or a bi-directional transformer. The embedding models may capture the semantic meaning and context of the text data. Utilizing the embedding models, similar or related text chunks may be represented by vectors that are close to each other in the vector space. In some embodiments, after the text chunks are successfully vectorized, they may be stored in a vector database (e.g., 225 of FIG. 2). The vector database may provide a structured storage for the text data, and facilitate efficient data retrieval and similarity searches.

At block 435, the computing system associates or links these vectors (e.g., 290-1 of FIG. 2) with their corresponding entities (e.g., 250 of FIG. 2) in the knowledge graph. Specifically, each node, represented as a node within the graph, may be associated with one or more vectors (e.g., "Basic Info" node 250 is associated with vectors 290-1 and 290-N, as illustrated in FIG. 2) within the vector database that capture the semantic meaning and context within the original text data. The association ensures that the semantic meaning and context within the unstructured text data are preserved and easily accessible in a structured format. By segmenting the data and associating each segment with the corresponding entity node, the system creates an accurate and comprehensive map of information within the unstructured text data. In some embodiments, each text chunk (e.g., 290-1 of FIG. 2) may be assigned a unique chunk ID, which serves as a distinct identifier for the segment of text data contained within each text chunk. The chunk ID may be embedded with the entity node within the knowledge graph. When certain entity nodes are identified as relevant to a given query or task, the chunk IDs corresponding to these entities may be returned to the system. Based on the chunk IDs, the system may rapidly locate and pull relevant vectorized text segments from the vector database (e.g., 225 of FIG. 2). The integration of a knowledge graph and a vector database may optimize the system's ability to handle complex queries or tasks, and allow the system to provide timely and accurate responses to these queries. More detail is discussed below with reference to FIG. 5.

Figure 5:
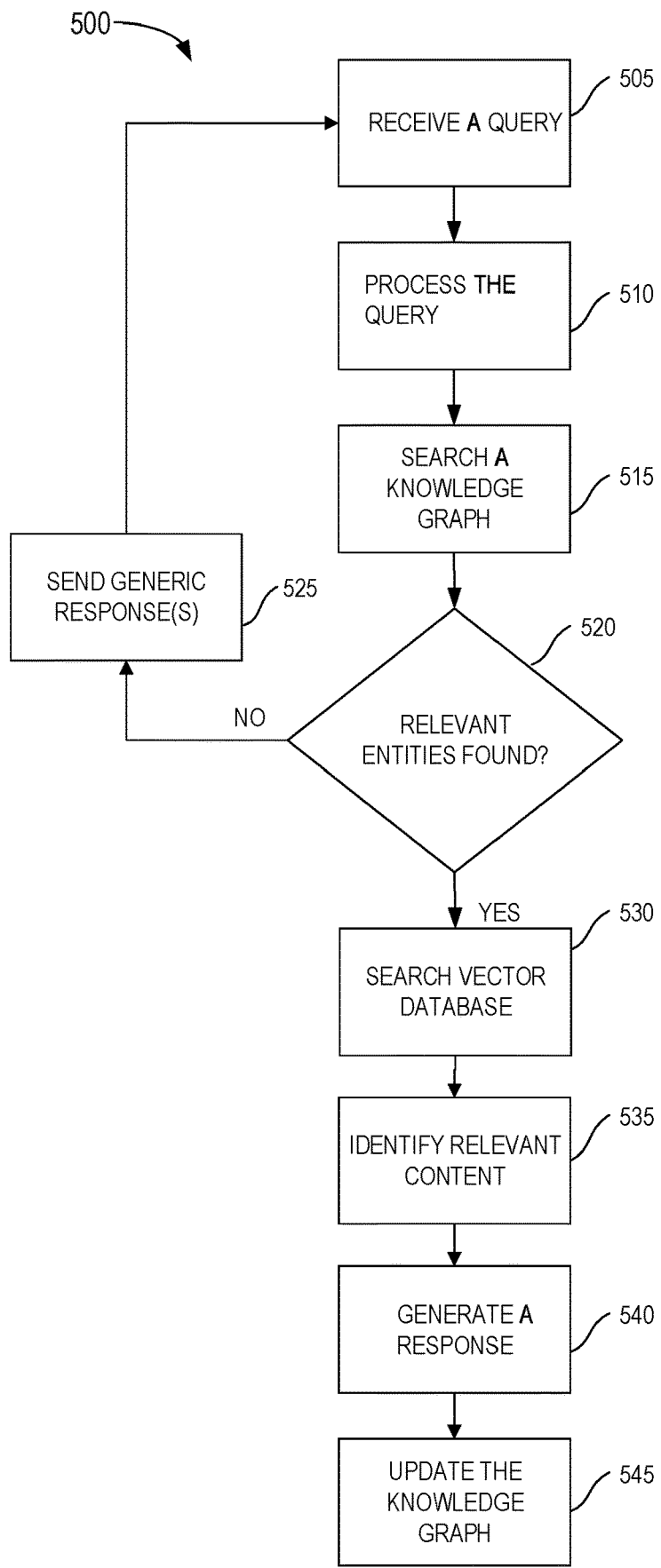
FIG. 5 depicts an example method for query processing and natural language response generation, according to some embodiments of the present disclosure.

FIG. 5 depicts an example method 500 for query processing and natural language response generation, according to some embodiments of the present disclosure. In some embodiments, the method 500 may be performed by one or more computing devices, such as the computer 101 as illustrated in FIG. 1 including the conversational query resolution code 180, the LLM based system 310 as illustrate in FIG. 3, and/or the computing device 700 as illustrated in FIG. 7.

At block 505, a computing system receives a user query. In some embodiments, the user query may be written in natural language and may vary in complexity. In some embodiments, simple queries may merely ask for direct extraction of specific information from the expansive unstructured text data, while complex queries may demand a series of detailed operations. For example, a query may require the system to "search contracts that have Company A as a contractor and the penalty for breach exceeding $50,000." To address such a request, the system may first search through the knowledge graph to identify all contracts with Company A as a contractor. When the penalty for breach is not explicitly mentioned, the system may need to pinpoint the total contract amount and the associated penalty percentage (or ratio), based on which, the system may perform calculations to determine if the potential breach penalty surpasses the $50,000 threshold. After completing the series of detailed analyses, the system may then generate a response to the query.

At block 510, the computing system uses a LLM to process the received query. The LLM model, trained to decipher natural language, may be used to understand the underlying context and intent of the query. When the query is complex (e.g., the query contains multiple conditions, dependencies, or requires a deep semantic understanding), the system may decompose the query into several sub-tasks. The LLM performs the decomposition using natural language processing and semantic analysis techniques. For example, the query that requires the system to "search contracts that have Company A as a contractor and penalty for breach exceeding $50,000" may be divided into three primary tasks: (1) querying the knowledge graph to identify contracts where Company A is listed as a contractor, returning chunk IDs related to contract breaches, and extracting basic information like the total sum of the contract and its delivery date (e.g., Task 1 315-1 of FIG. 3); (2) based on the chunk IDs, retrieving their corresponding text chunks from a vector database, and analyzing the content within these text chunks to determine penalty clauses (e.g., Task 2 315-2 of FIG. 3); (3) calculating the potential breach penalty, excluding contracts where the penalty for breach does not exceed $50,000, and producing a natural language response (e.g., Task 3 315-3 of FIG. 3). In some embodiments, segmenting a query into multiple sub-tasks may streamline the data retrieval and processing workflows. The system may execute each task independently (e.g., sequentially or in parallel). This approach may effectively reduce the risk of overlooking some important details, and therefore ensure that each part of the query is addressed thoroughly. The strategic decomposition approach may improve the accuracy and precision of the generated responses.

At block 515, the computing system searches the knowledge graph. The search aims to find relevant information related to one specific task derived from the received query. Using the above mentioned example as a reference, one of the three primary tasks for the query to "search contracts that have Company A as a contractor and the penalty for breach exceeding $50,000" involves querying the knowledge graph to pinpoint contracts where Company A is designated as a contractor (e.g., Task 1 315-1 of FIG. 3). The search may retrieve details of those contracts, including chunk IDs related to terms of breach, and other relevant attributes, such as the total sum of the contract and its delivery date.

At block 520, the computing system determines whether any relevant entities have been identified from the knowledge graph search. If the system determines that no relevant entities match the user's query criteria, or if the query is so simple that it can be directly addressed by the knowledge graph without the need for additional vector searches, the method 500 proceeds to block 525, where the system generates generic responses. For example, when no relevant entities are found, the response may be phrased as "Sorry, I couldn't find any matches for your query." When the answer can be generated directly by the knowledge graph, the system may respond with statements such as "Company A has 10 contracts on record," or "The total sum for the contract you mentioned is $1,000,000." The system may then send these generic responses to the user. However, if relevant identities are identified, and their associated chunk IDs are returned, the method 500 proceeds to block 530.

At block 530, the computing system accesses a vector database (e.g., 225 of FIG. 3) to retrieve relevant text chunks (e.g., 290-3 of FIG. 3) based on the chunk IDs returned from block 520. In some embodiments, these text chunks may include sections of unstructured data that the knowledge graph has identified as relevant to the received query. In some embodiments, these text chunks may be transformed into vectors using embedding models and saved in the vector database. In some embodiments, the vector representations of the text chunks may capture the semantic content of the unstructured data and allow for efficient and vector-based searches.

At block 535, after retrieving the text chunks, the computing system analyzes data within these text chunks. In some embodiments, the computing system may conduct a vector-based search to identify content or text sections most relevant to the query. In some embodiments, the computing system may convert the query or the particular task into a vector, and compare the semantic similarity between the query and the text sections within the retrieved text chunks. Various metrics may be used to measure the similarity, such as cosine similarity, Euclidean distance, or Manhattan distance. In some embodiments, depending on these similarity measures, the system may identify a certain number of text sections (e.g., the top 10) that are most relevant, and these sections may then be used as a basis for generating a response. Using the above mentioned example as a reference, if the chunk IDs associated with terms of breach are returned, the system may retrieve the vector representation of the text chunks corresponding to these chunk IDs from the vector database. These vectorized text chunks may contain detailed information about the terms of breach (e.g., 290-3 of FIG. 3). When data concerning the penalty for breach is not explicitly available, the system may perform a vector search to identify the most semantically relevant information, such as breach triggering conditions, penalty percentages, or any calculation logic. Based on these results, the system may calculate the penalty amount for each contract having Company A as a contractor, and subsequently generate a response to the received query.

At block 540, the computing system generates a response to the received query. This may involve using a LLM to summarize the identified relevant information and generate a coherent and natural language reply in response to the user's query. Using the aforementioned example as a reference, the generated response to the query to "search contracts that have Company A as a contractor and the penalty for breach exceeding $50,000" may include a detailed list of contracts. Within the list, it may specify the names of parties, penalty amount, breach triggering conditions, and other associated details. The generated response is presented, e.g., via the computer 101 via a visual display of text on a display screen of the computer 101 and/or via an audible playing of an audio message via a speaker connected to the computer 101.

At block 545, the computing system updates the knowledge graph based on user feedback regarding the generated response. Following the above mentioned example, when the user provides confirmations or clarifications on the generated response related to breaches, the system may update the knowledge graph by adding more detailed sub-nodes. For example, two additional sub-nodes may be added following the "Breach Related" node (e.g., 260 of FIG. 2). One node (e.g., 325 of FIG. 3) may include an attribute of "breach triggering," and a value of "delivery data is delayed by more than 30 days compared to the delivery data agreed upon in the contract," and another node (e.g., 330 of FIG. 3) may include an attribute of "penalty ratio" and store values like "2% of the total contract amount." By updating the knowledge graph based on the generated response, the system may become more efficient in handling similar or related queries in the future. Instead of performing a thorough search of the vector database each time, the system now may directly extract answers from the information embedded within the identified nodes of the knowledge graph. The updating approach may effectively reduce the computational overhead for generating answers to new queries. Such feedback is received via a graphical user interface generated by the conversational query resolution code 180 and displayed for the user via a display screen of a computer such as the computer 101. The user engages with the graphical user interface, e.g., by providing input via an input device such as a keyboard and/or a microphone connected to the computer 101. The graphical user interface is presented along with the query answer, e.g., after the query answer is presented, to ask for confirmation of relevance/accuracy.

Figure 6:
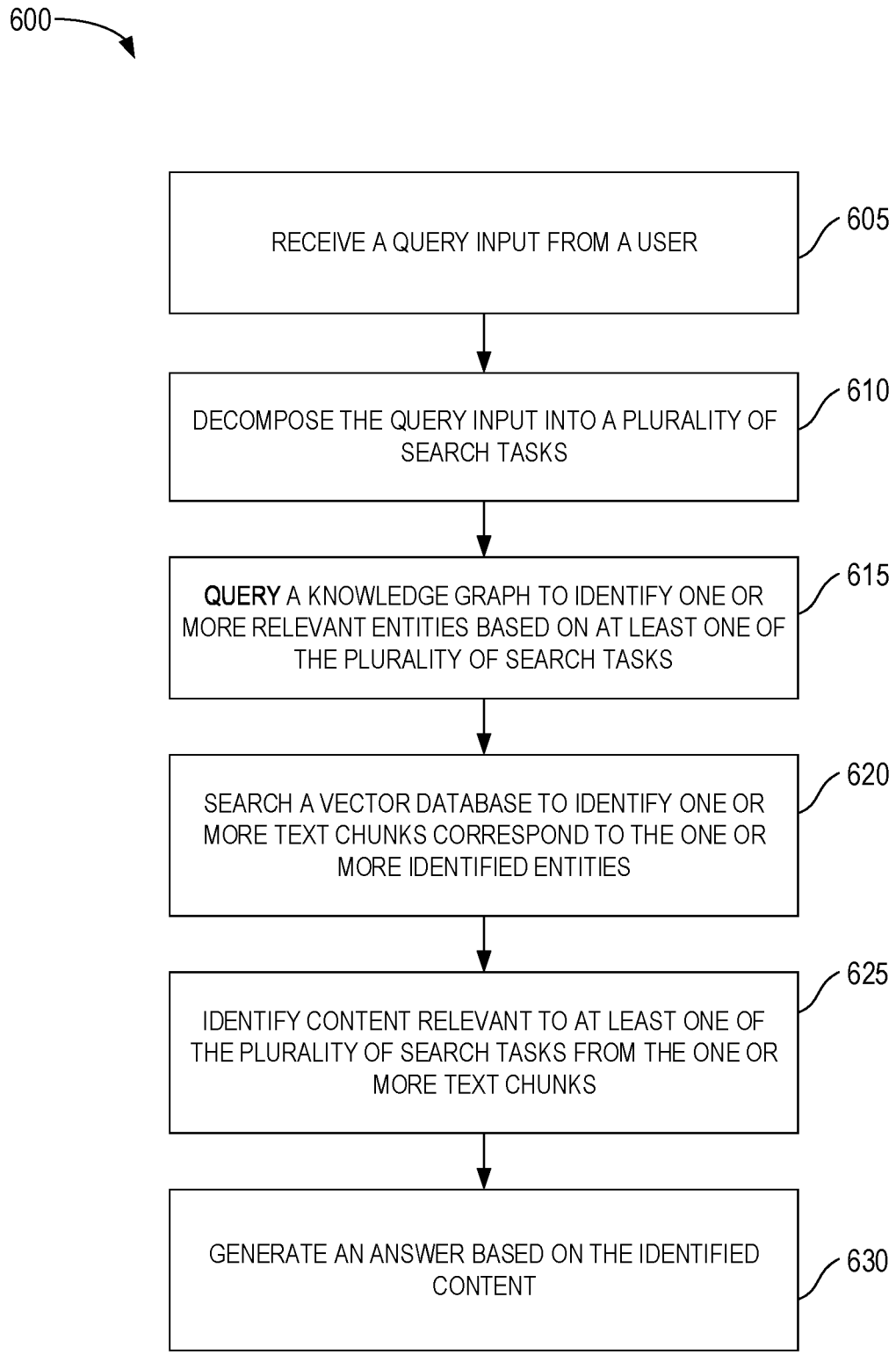
FIG. 6 depicts a flow diagram of an example method for generating knowledge-based conversational responses for received queries, according to some embodiments of the present disclosure.

FIG. 6 depicts a flow diagram of an example method 600 for generating knowledge-based conversational responses for received queries, according to some embodiments of the present disclosure.

At block 605, a computing system receives a query input (e.g., 305 of FIG. 3) from a user.

At block 610, the computing system decomposes the query input into a plurality of tasks (e.g., 315 of FIG. 3).

At block 615, the computing system queries a knowledge graph (e.g., 215 of FIGS. 2 and 3) to identify one or more relevant entities (e.g., 260 of FIG. 3) based on at least one of the plurality of tasks. In some embodiments, the knowledge graph may comprise a plurality of entities (e.g., 260 of FIG. 2), and each entity of the plurality of entities in the knowledge graph is associated with a respective text chunk (e.g., 290-3 of FIG. 2) within the vector database using a chunk identifier. In some embodiments, each of the respective text chunks may comprise text extracted from a corpus of unstructured documents. In some embodiments, each respective text chunk may be vectorized into a respective vector representation using an embedding model.

At block 620, the computing system searches a vector database (e.g., 225 of FIG. 3) to identify one or more text chunks (e.g., 290-3 of FIG. 3) that correspond to the one or more relevant entities.

At block 625, the computing system identifies content relevant to at least one of the plurality of tasks from the one or more text chunks. In some embodiments, the content relevant to the plurality of tasks from the one or more text chunks may be identified using a vector-based similarity technique. In some embodiments, the vector-based similarity technique used to identify the content may comprise comparing at least one of (i) cosine similarity or (ii) distance similarity between vector representations of the one or more text chunks and each of the plurality of tasks.

At block 630, the computing system generates an answer (e.g., 320 of FIG. 3) based on the identified content. In some embodiments, the computing system may further receive feedback from the user regarding the accuracy of the answer, and update the knowledge graph (e.g., 215 of FIG. 3) based on the feedback. In some embodiments, the computing system may update the knowledge graph by adding one or more new entities (e.g., 325 and 330 of FIG. 3) to the knowledge graph, wherein each of the one or more new entities comprises data derived from the answer. In some embodiments, the computing system may generate the answer (e.g., 320 of FIG. 3) by aggregating the identified content based on logical relationships between each of the plurality of tasks, and generating the answer in natural language based on the aggregated content using natural language processing algorithms.

FIG. 7 depicts an example computing device 700 for knowledge extraction and natural language response generation, according to some embodiments of the present disclosure. Although depicted as a physical device, in some embodiments, the computing device 700 may be implemented using virtual device(s), and/or across a number of devices (e.g., in a cloud environment). The computing device 700 can be embodied as any computing device, such as the computer 101 as illustrated in FIG. 1, the LLM based system 310 as illustrated in FIG. 3.

As illustrated, the computing device 700 includes a CPU 705, memory 710, storage 715, one or more network interfaces 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a graph generation component 745, a text segment & vectorization component 750, a vector database management component 755, a query processing component 760, a graph search engine 765, and a response generation component 770. Although depicted as a discrete component for conceptual clarity, in some embodiments, the operations of the depicted component (and others not illustrated) may be combined or distributed across any number of components. Further, although depicted as software residing in memory 710, in some embodiments, the operations of the depicted components (and others not illustrated) may be implemented using hardware, software, or a combination of hardware and software.

In one embodiment, the graph generation component 745 may generate a knowledge graph for a corpus of unstructured data (e.g., contracts). The knowledge graph is generated by extracting important entities from the unstructured data and mapping out their relationships. In some embodiments, the knowledge graph may provide a visual and structured representation of the unstructured data, and facilitate more efficient data search and retrieval. In one embodiment, the graph generation component 745 may update an existing knowledge graph based on answers that the response generation component 775 produces and feedback received from a user.

In one embodiment, the text segment & vectorization component 750 may segment the unstructured data into different text chunks, with each text chunk containing certain sections of text within the unstructured data. Following the segmentation process, the text segment & vectorization component 750 may then transform these text chunks into vector representations using proper embedding models. The generated vector representations may capture the context and semantic meaning within the original text, and may be used for future vector-based searches.

In one embodiment, the vector database management component 755 may store the vectorized text chunks into a vector database. The vector database management component 755 may manage the searching, retrieval, and updating of the vectorized text data, and may facilitate rapid access during search operations (e.g., using chunk ID). In some embodiments, the vector database management component 755 may further integrate a knowledge graph with a vector database, both of which are created for or used to save the same corpus of unstructured data. Specifically, the vector database management component 755 may link or associate entity nodes within the knowledge graph to corresponding vectorized text chunks within the database. In some embodiments, the association may be established by a chunk ID assigned to each text chunk. In some embodiments, the integration that combines structured knowledge representation with semantically-embedded vectorized chunks may allow the system to quickly confine vector search scopes for a received query (e.g., by identifying entities within the knowledge graph that are relevant to the query, and promptly retrieving relevant vectorized chunks associated with these identified entities).

In one embodiment, the query processing component 760 may use a LLM to understand a received user query. When the query requires complex operations, the query processing component 760 may decompose the user query into several more detailed sub-tasks.

In one embodiment, the graph search engine 765 may be configured to query the knowledge graph based on a received query or a particular sub-task. The graph search engine In one embodiment, the graph search engine 765 may scan the graph to locate nodes that are relevant to the query. After one or more entity nodes are identified, the chunk IDs of their associated text chunks may be returned. Based on the chunk IDs, the vector database management component 755 may then extract the corresponding vectorized text chunks from the vector database.

In one embodiment, the response generation component 770 may analyze the text within each retrieved text chunk. Specifically, the response generation component 770 may perform vector searches by comparing the vectors of the query or its sub-tasks with the vectors of the retrieved text chunks. Through the vector comparison, the response generation component 770 may identify content that is most semantically related to the user's query. Based on the identified content, the response generation component 770 may create a natural language response that answers the user's query accurately and comprehensively.

In the illustrated example, the storage 715 may include existing knowledge graph data 780, text chunk data 785, and historical user queries and responses 790. In some embodiments, the text chunk data 785 may include segments of unstructured text that have been indexed and vectorized for efficient retrieval and analysis. In some embodiments, historical user queries and responses 790 may include queries the computing device 700 previously received and the corresponding responses the device 700 generated. In some embodiments, these records may be used to further optimize the knowledge extraction and answer generation processes. In some embodiments, the aforementioned data may be saved in a remote database that connects to the computing device 700 via a network.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:
    receiving a query input from a user;

decomposing the query input into a plurality of tasks;
querying a knowledge graph to identify one or more relevant entities based on at least one of the plurality of tasks, wherein each of the one or more entities comprises text information related to a respective portion of a document;
searching a vector database to identify one or more text chunks, wherein each of the one or more text chunks comprises contextual information in natural language for a respective identified relevant entity and is linked to the respective identified relevant entity in the knowledge graph using a chunk identifier;
identifying content relevant to at least one of the plurality of tasks by parsing the contextual information in natural language within the one or more text chunks; and
generating an answer for the query based on the identified content.

2. The computer-implemented method of claim 1, wherein each of the one or more text chunks comprises text extracted from a corpus of unstructured documents.

3. The computer-implemented method of claim 1, wherein each respective text chunk is vectorized into a respective vector representation using an embedding model.

4. The computer-implemented method of claim 1, wherein the content relevant to the plurality of tasks from the one or more text chunks is identified using a vector-based similarity technique.

5. The computer-implemented method of claim 4, wherein the vector-based similarity technique used to identify the content comprises comparing at least one of (i) cosine similarity or (ii) distance similarity between vector representations of the one or more text chunks and each of the plurality of tasks.

6. The computer-implemented method of claim 1, further comprising:
receiving feedback from the user regarding an accuracy of the answer; and
updating the knowledge graph based on the feedback.

7. The computer-implemented method of claim 6, wherein updating the knowledge graph and the vector database based on the feedback comprises adding one or more new entities to the knowledge graph, wherein each of the one or more new entities comprises data derived from the answer.

8. The computer-implemented method of claim 1, wherein generating the answer based on the identified content comprises:
aggregating the identified content based on logical relationships between each of the plurality of tasks; and
generating the answer in natural language based on the aggregated content using natural language processing algorithms.

9. A system comprising:
one or more memories collectively storing computer-executable instructions; and
one or more processors, wherein the one or more processors are configured to, individually or collectively, perform an operation comprising:
receiving a query input from a user;
decomposing the query input into a plurality of tasks;
querying a knowledge graph to identify one or more relevant entities based on at least one of the plurality of tasks, wherein each of the one or more entities comprises text information related to a respective portion of a document;
searching a vector database to identify one or more text chunks, wherein each of the one or more text chunks comprises contextual information in natural language for a respective identified relevant entity and is linked to the respective identified relevant entity in the knowledge graph using a chunk identifier;
identifying content relevant to at least one of the plurality of tasks by parsing the contextual information in natural language within the one or more text chunks; and
generating an answer for the query based on the identified content.

10. The system of claim 9, wherein each of the one or more text chunks comprises text extracted from a corpus of unstructured documents.

11. The system of claim 9, wherein each respective text chunk is vectorized into a respective vector representation using an embedding model.

12. The system of claim 9, wherein the content relevant to the plurality of tasks from the one or more text chunks is identified using a vector-based similarity technique.

13. The system of claim 12, wherein the vector-based similarity technique used to identify the content comprises comparing at least one of (i) cosine similarity or (ii) distance similarity between vector representations of the one or more text chunks and each of the plurality of tasks.

14. The system of claim 9, wherein the computer-executable instructions, when executed by the one or more processors, further cause the system to:
receive feedback from the user regarding an accuracy of the answer; and
update the knowledge graph based on the feedback.

15. The system of claim 14, wherein the computer-executable instructions, when executed by the one or more processors, further cause the system to add one or more new entities to the knowledge graph based on the feedback, wherein each of the one or more new entities comprises data derived from the answer.

16. The system of claim 9, wherein, to generate the answer based on the identified content, the computer-executable instructions, when executed by the one or more processors, further cause the system to:
aggregate the identified content based on logical relationships between each of the plurality of tasks; and
generate the answer in natural language based on the aggregated content using natural language processing algorithms.

17. One or more computer-readable storage media containing, in any combination, computer program code that, when executed by operation of a computer system, performs operations comprising:
receiving a query input from a user;
decomposing the query input into a plurality of tasks;
querying a knowledge graph to identify one or more relevant entities based on at least one of the plurality of tasks, wherein each of the one or more entities comprises text information related to a respective portion of a document;
searching a vector database to identify one or more text chunks, wherein each of the one or more text chunks comprises contextual information in natural language for a respective identified relevant entity and is linked to the respective identified relevant entity in the knowledge graph using a chunk identifier;
identifying content relevant to at least one of the plurality of tasks by parsing the contextual information in natural language within the one or more text chunks; and generating an answer for the query based on the identified content.

\* \* \* \* \*